US008245732B2

(12) United States Patent
Coscarella

(10) Patent No.: US 8,245,732 B2
(45) Date of Patent: Aug. 21, 2012

(54) APPARATUS FOR PRESSURE TESTING A PLUMBING INSTALLATION

(76) Inventor: Gabe Coscarella, Edmonton (CA)

( * ) Notice: Subject to any disclaimer, the term of this patent is extended or adjusted under 35 U.S.C. 154(b) by 360 days.

(21) Appl. No.: 12/506,874

(22) Filed: Jul. 21, 2009

(65) Prior Publication Data

US 2010/0012212 A1 Jan. 21, 2010

(30) Foreign Application Priority Data

Jul. 21, 2008 (CA) ..................................... 2638336

(51) Int. Cl.
*F16L 55/10* (2006.01)
(52) U.S. Cl. ............................................. 138/90; 138/89
(58) Field of Classification Search .................... 138/89, 138/90
See application file for complete search history.

(56) References Cited

U.S. PATENT DOCUMENTS

| | | | |
|---|---|---|---|
| 1,933,117 A | 10/1933 | Markle | |
| 2,327,615 A | 8/1943 | Ankarlo | |
| 2,373,242 A | 4/1945 | Glashow | |
| 3,019,819 A | 2/1962 | Ankarlo | |
| 3,154,106 A | 10/1964 | Ver Nooy | |
| 3,327,379 A * | 6/1967 | Loydell | 29/450 |
| 3,442,295 A | 5/1969 | Ver Nooy | |
| 3,467,120 A * | 9/1969 | Hill et al. | 137/68.25 |
| 3,635,234 A | 1/1972 | Dawson | |
| 3,654,965 A | 4/1972 | Gramain | |
| 3,815,779 A | 6/1974 | Ludwig | |
| 3,844,585 A | 10/1974 | Sands | |
| 4,040,450 A | 8/1977 | Boundy | |
| 4,329,857 A | 5/1982 | Kittle | |
| 4,429,568 A | 2/1984 | Sullivan | |
| 4,436,310 A | 3/1984 | Sawabe | |
| 4,542,642 A | 9/1985 | Tagliarino | |
| 4,602,504 A | 7/1986 | Barber | |

(Continued)

FOREIGN PATENT DOCUMENTS

GB 2216063 A 10/1989

OTHER PUBLICATIONS

"Mainline Adapt-a-Valve," Mainline Back Flow Products, Edmonton, Canada, as early as Mar. 2006, 2-page brochure.

(Continued)

*Primary Examiner* — James Hook
(74) *Attorney, Agent, or Firm* — Christensen O'Connor Johnson Kindness PLLC

(57) ABSTRACT

An apparatus for pressure testing a plumbing installation includes a flexible cylindrical body having a peripheral sidewall, a closed end and an open end. A positioning flange extends outwardly from the peripheral sidewall at the open end to facilitate positioning cylindrical body with an end of a pipe into which the cylindrical body has been inserted. An end wall is positioned at the closed end that is. The end wall is curved inwardly and has an inward cylindrical flow channel closed by a partially removable plug. A gripping strip is secured to the partially removable plug that closes an inward cylindrical plug and extends through and past the open end of the cylindrical body, such that upon a force being exerting upon the gripping strip the plug lifts to open the cylindrical flow channel and upon a force continuing to be exerted upon the gripping strip the cylindrical body rolls inside out thereby enabling the cylindrical body to be removed from the pipe.

3 Claims, 4 Drawing Sheets

U.S. PATENT DOCUMENTS

| | | | | |
|---|---|---|---|---|
| 4,706,482 A | | 11/1987 | Barber | |
| 4,763,510 A | | 8/1988 | Palmer | |
| 4,834,825 A | | 5/1989 | Adams | |
| 4,848,155 A | | 7/1989 | Huber | |
| 4,850,503 A | | 7/1989 | Larsson | |
| 4,863,306 A | | 9/1989 | Muenzer | |
| 4,902,043 A | | 2/1990 | Zillig | |
| 4,936,350 A | * | 6/1990 | Huber | 138/90 |
| 5,033,510 A | | 7/1991 | Huber | |
| 5,078,429 A | | 1/1992 | Braut | |
| 5,106,127 A | | 4/1992 | Briet | |
| 5,163,480 A | | 11/1992 | Huber | |
| 5,287,730 A | | 2/1994 | Condon | |
| 5,297,581 A | | 3/1994 | Godfrey | |
| 5,507,501 A | | 4/1996 | Palmer | |
| 5,711,536 A | | 1/1998 | Meyers | |
| 5,740,830 A | | 4/1998 | Mankins | |
| 5,826,609 A | | 10/1998 | Watts | |
| 6,029,684 A | | 2/2000 | Watts | |
| 6,032,515 A | | 3/2000 | Huber | |
| 6,035,898 A | | 3/2000 | Dominguez | |
| 6,062,262 A | | 5/2000 | Tash | |
| 6,082,183 A | * | 7/2000 | Huber | 73/49.1 |
| 6,085,362 A | | 7/2000 | Huber | |
| 6,085,363 A | | 7/2000 | Huber | |
| 6,209,584 B1 | * | 4/2001 | Huber | 138/89 |
| 6,234,007 B1 | | 5/2001 | Pampinella | |
| 6,267,001 B1 | | 7/2001 | Duncan | |
| 6,289,935 B1 | | 9/2001 | Tash | |
| 6,390,118 B1 | | 5/2002 | Mankins | |
| 6,564,823 B1 | | 5/2003 | Mankins | |
| 6,575,475 B1 | | 6/2003 | Duncan | |
| 6,588,454 B1 | | 7/2003 | Johnson | |
| 6,595,242 B2 | | 7/2003 | Duncan | |
| 6,637,464 B1 | | 10/2003 | Cornwall | |
| 7,021,337 B2 | | 4/2006 | Markham | |
| 7,472,912 B2 | | 1/2009 | Duncan | |
| 7,665,486 B2 | * | 2/2010 | Coscarella | 138/90 |
| 2004/0129327 A1 | | 7/2004 | Hooper | |

OTHER PUBLICATIONS

"Palmer's ® Rip Plug System" (Product Information) © 2008 Palmer's Plastics, <http://www.ripplug.com/rip_testplug_cord.html> [retrieved Sep. 30, 2009] 2 pages.

"Palmer's ® Rip Plug Design" (Product Information) © 2008 Palmer's Plastics <http://www.ripplug.com/rip_plug.html> [retrieved Oct. 1, 2009] 2 pages.

* cited by examiner

APPARATUS FOR PRESSURE TESTING A PLUMBING INSTALLATION

FIELD

Pressure testing of plumbing installations to check for leaks.

BACKGROUND

U.S. Pat. No. 6,082,183 (Huber) discloses a dome shaped baffle structure that is held in position within a pipe by an annular baffle carriage. A line is attached to a lug positioned on a concave surface of the dome shaped baffle. Upon a force being exerted upon a lug, the dome shaped baffle collapses and is released from the baffle carriage.

SUMMARY

There is provided an apparatus for pressure testing a plumbing installation, comprising a flexible cylindrical body having a peripheral sidewall, a closed end and an open end. A positioning flange extends outwardly from the peripheral sidewall at the open end to facilitate positioning the cylindrical body within an end of a pipe into which the cylindrical body has been inserted. An end wall is positioned at the closed end. The end wall is curved inwardly where the end wall connects to the peripheral sidewall and having an inward cylindrical flow channel closed by a partially removable plug. A gripping strip is secured to the partially removable plug and extends through and past the open end of the cylindrical body, such that upon a force being exerting upon the gripping strip the partially removable plug lifts to open the cylindrical flow channel and upon a force continuing to be exerted upon the gripping strip the cylindrical body rolls inside out thereby enabling the cylindrical body to be removed from the pipe.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
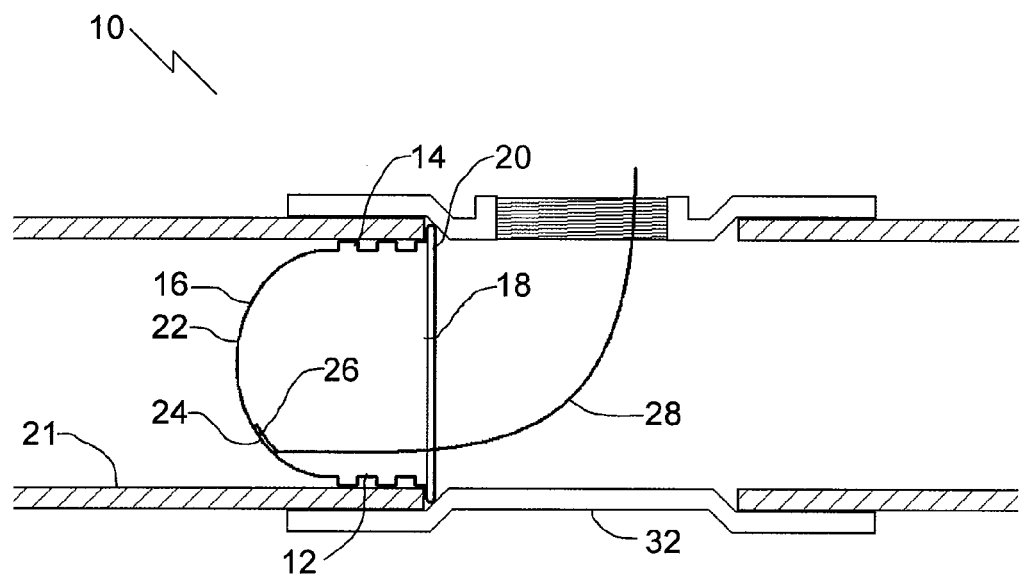
FIG. 1 is a side view in section of an apparatus for pressure testing a plumbing installation.
Figure 2:
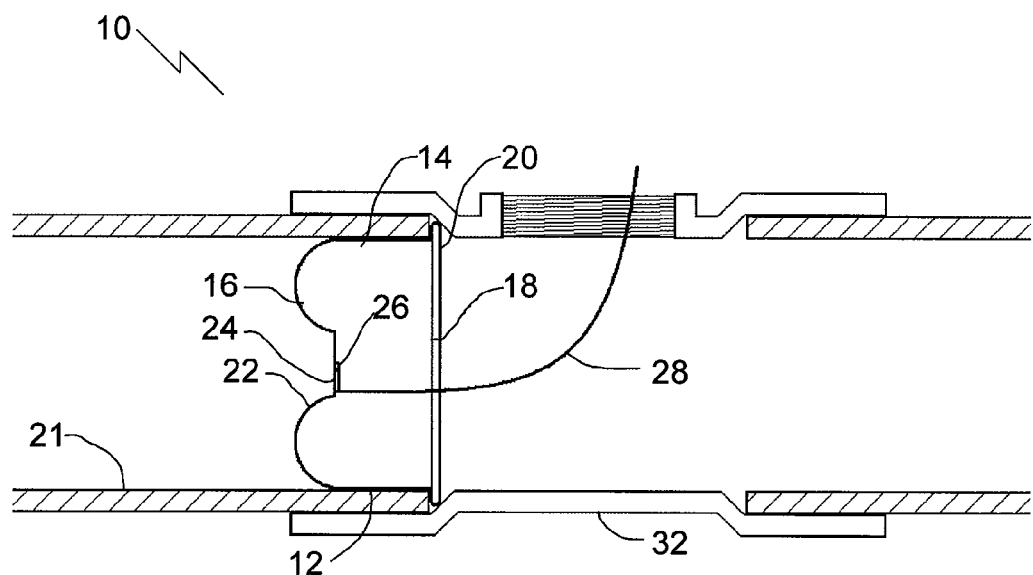
FIG. 2 is a side view in section of an alternative design for the apparatus shown in FIG. 1.

An apparatus for pressure testing a plumbing installation, generally identified by reference numeral 10, will now be described with reference to FIGS. 1 through 5.

Structure and Relationship of Parts:

Referring to FIG. 1, apparatus 10 includes a flexible cylindrical body 12 having a peripheral sidewall 14, a closed end 16 and an open end 18. A positioning flange 20 extends outwardly from peripheral sidewall 14 at open end 18 to facilitate positioning cylindrical body 12 within an end of a pipe 21 into which cylindrical body 12 has been inserted. When inserted into pipe 21, sidewall 14 creates a seal between cylindrical body 12 and pipe 21. An end wall 22 is positioned at closed end 16. End wall 22 is curved inwardly where end wall 22 connects to peripheral sidewall 14, and has an inward cylindrical flow channel 24 closed by a partially removable plug 26. Plug 26 may be frangible, attached by adhesive, or may be an insert. A gripping strip 28 is secured to plug 26 and extends through and past open end 18 of cylindrical body 12, such that when a certain force is exerted upon gripping strip 28, the plug lifts to open cylindrical flow channel 24. Upon a force continuing to be exerted upon gripping strip 28, cylindrical body 12 rolls inside out thereby enabling cylindrical body 12 to be removed from pipe 21. A plug 30 is provided to re-seal cylindrical flow channel 24 if it becomes necessary to perform another pressure test.

Operation:

The use of apparatus 10 will now be described with respect to the embodiment shown in FIGS. 2 through 5. Referring to FIG. 1, cylindrical body 12 is first inserted into pipe 21. Cylindrical body 12 is designed to be friction fit into pipe 21, and flange 20 provides an additional stop surface that is butted up against a shoulder in fitting 32. As the plumbing system, of which pipe 21 and fitting 32 form part of, is pressure tested, the pressure builds against curved end wall. The curved surface converts the axial pressure into radial pressure which provides and additional sealing pressure to cylindrical body 12.

Figure 3:
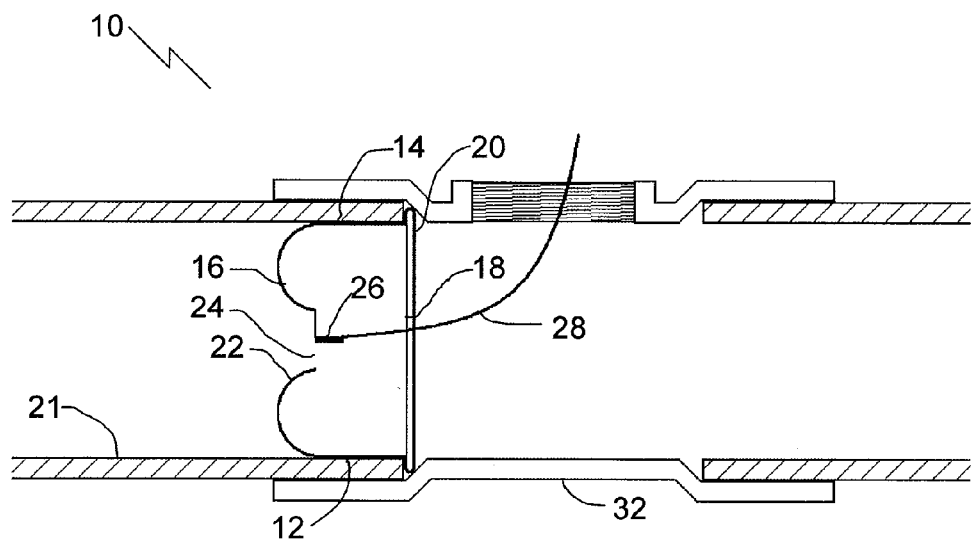
FIG. 3 is a side view in section of the apparatus of FIG. 2 with the partially removable plug opened.
Figure 4:
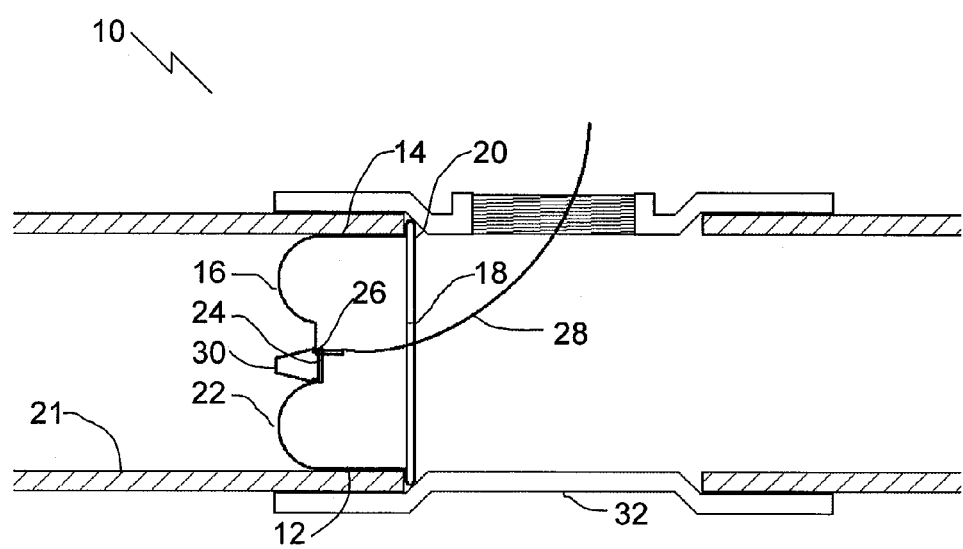
FIG. 4 is a side view in section of the apparatus of FIG. 2 with a plug inserted into the cylindrical flow channel.
Figure 5:
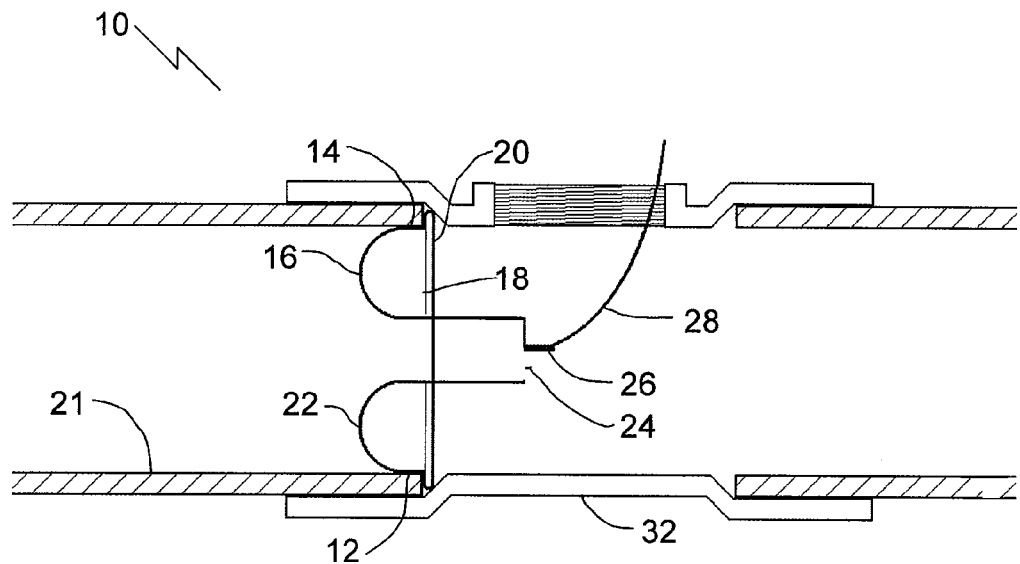
FIG. 5 is a side view in section of the apparatus of FIG. 2 with the cylindrical body being rolled out of a pipe.

Referring to FIG. 3, once the pressure test is complete, gripping strip 28 is pulled to open plug 26 to allow the fluid to escape through cylindrical flow channel 24. Referring to FIG. 4, if it is necessary to retest the plumbing installation, plug 30 can be used to block cylindrical flow channel 24 to allow the testing to reoccur. Referring to FIG. 5, once the pressure testing is completed, gripping strip 28 is pulled further to cause cylindrical body 12 to "roll" out of pipe 21, such that it can be removed. By applying a force at this point, sidewall 14 is collapsed inward, such that it pulls away from pipe 21.

Figure 6:
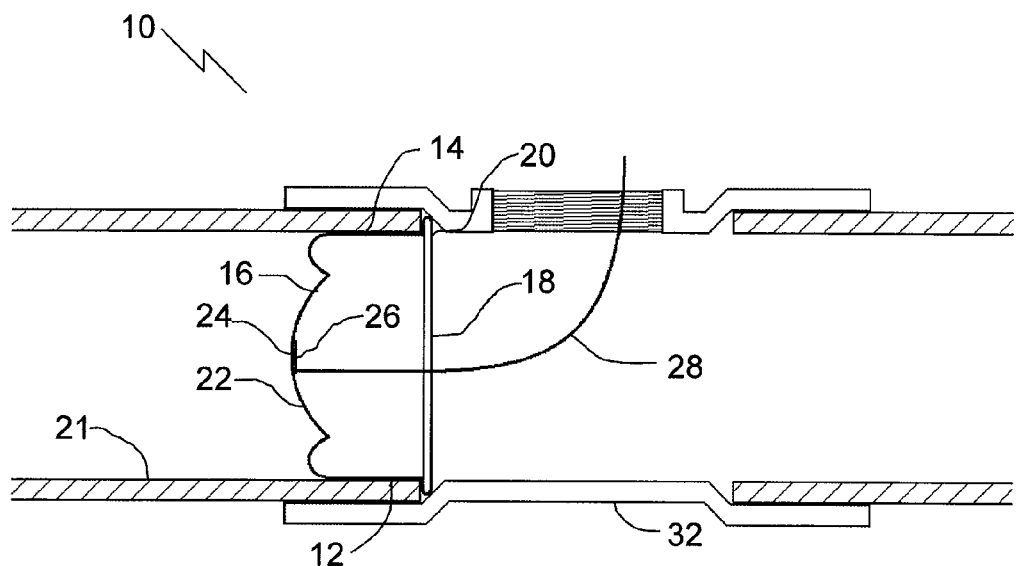
FIG. 6 through 8 are side views in section of alternative designs for the apparatus shown in FIG. 1.
Figure 7:
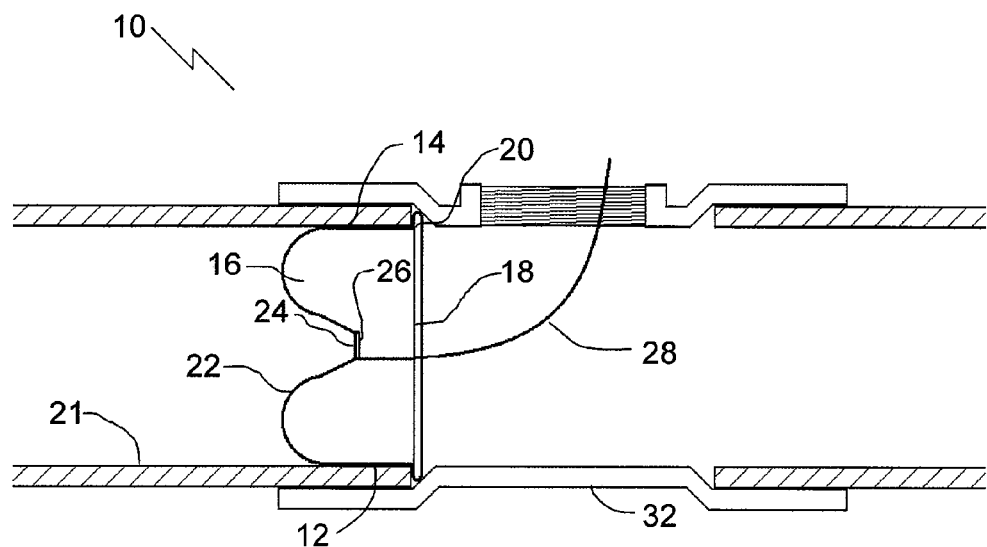
Figure 8:
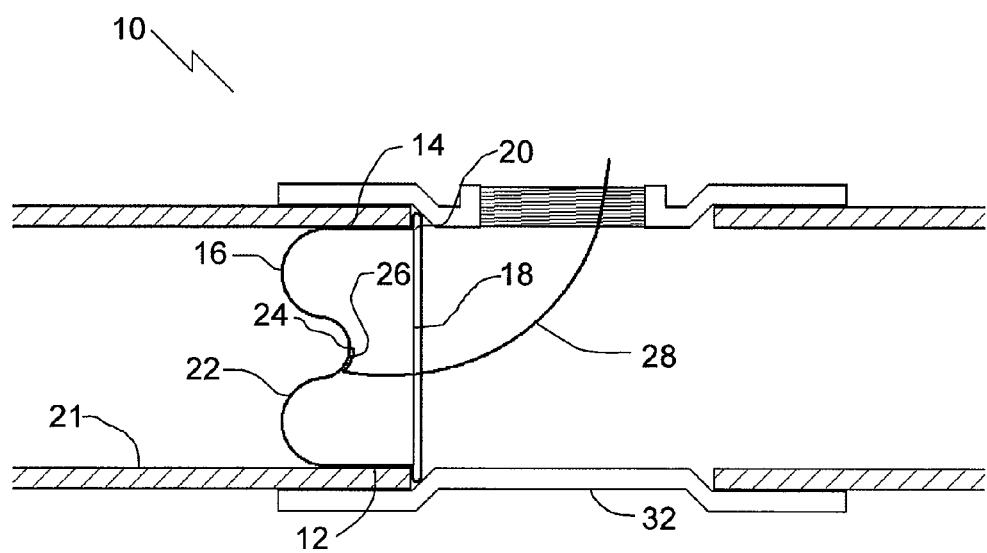

Variations:

Referring to FIGS. 6 through 8, additional designs of end wall 22 are shown. As can be seen from a comparison of the various embodiments depicted herein, it is important that end wall 22 meet peripheral sidewall 14 in a manner that allows body 12 to roll out.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. An apparatus for pressure testing a plumbing installation, comprising:

a flexible cylindrical body having a peripheral cylindrical sidewall, a closed end, and an open end;

a positioning flange extending outwardly from the peripheral cylindrical sidewall at the open end to facilitate positioning the cylindrical body within an end of a pipe into which the cylindrical body has been inserted, the peripheral cylindrical sidewall engaging an inner surface of the pipe;

an end wall at the closed end, the end wall being curved inwardly where the end wall connects to the peripheral cylindrical sidewall and having an inward cylindrical flow channel closed by a partially removable plug; and a gripping strip secured to the partially removable plug and extending through and past the open end of the cylindrical body, such that upon a force being exerted upon the gripping strip, the partially removable plug lifts to open the cylindrical flow channel, and upon a force continuing to be exerted upon the gripping strip, the cylindrical body rolls inside out thereby enabling the cylindrical body to be removed from the pipe.

2. The apparatus of claim 1, wherein the peripheral cylindrical sidewall is friction fit into the pipe.

3. A method of pressure testing a plumbing installation, comprising the steps of:

providing:

a flexible cylindrical body having a peripheral cylindrical sidewall, a closed end, and an open end;

a positioning flange extending outwardly from the peripheral cylindrical sidewall at the open end;

an end wall at the closed end, the end wall being curved inwardly where the end wall connects to the peripheral cylindrical sidewall and having an inward cylindrical flow channel closed by a partially removable plug; and a gripping strip secured to the partially removable plug and extending through and past the open end of the cylindrical body;

inserting the flexible cylindrical body into a pipe such that the peripheral cylindrical sidewall seals and is friction fit against an inner surface of the pipe;

installing a fitting such that the positioning flange is secured between the fitting and an end of the pipe;

performing a pressure test by pressurizing the pipe; and removing the flexible cylindrical body from the tubular body by exerting a force upon the partially removable plug via the gripping strip to open the cylindrical flow channel and continuing to exert a force upon the gripping strip to roll the cylindrical body inside out.

\* \* \* \* \*